United States Patent Office 2,701,257
Patented Feb. 1, 1955

2,701,257

PREPARATION OF PHYTIN

McCalip J. Thomas, Decatur, Ill., assignor to A. E. Staley Manufacturing Company, Decatur, Ill., a corporation of Delaware No Drawing. Application June 2, 1951,
Serial No. 229,649

1 Claim. (Cl. 260—461)

This invention relates to the preparation and purification of insoluble salts of phytic acid and is especially concerned with the calcium salt. Such salts are ordinarily referred to as "phytins."

Phytic acid is a phosphoric acid ester of inositol, in which each of the six hydroxyl groups in inositol has been esterified with a molecule of orthophosphoric acid. Since orthophosphoric acid is a tribasic acid and since only one hydrogen is affected in the esterification with the hydroxyl group of the inositol, each molecule of phosphoric acid is still functional as a dibasic acid. Since there are six of these phosphoric acid molecules now associated with inositol in the ester, the ester functions as a dodecabasic acid. As such, the phytic acid is capable of forming salts in which metallic and other positive ions may replace hydrogen in the acid in varying degrees, up to the limit of replacing all twelve hydrogen atoms.

The use of calcium phytate in both the food and pharmaceutical industries, particularly the latter, has spurred interest in ways and means of producing a more refined grade of calcium phytate, one that is relatively high in both calcium and phosphorus and low in color and nitrogenous and acid insoluble substances. The use of calcium phytate as a raw material source for the preparation of inositol requires a product meeting the low nitrogen requirement, otherwise the process of manufacture becomes quite unsatisfactory due to the production of disagreeable, odoriferous substances formed during the hydrolysis and a carry-over of impurities into the inositol-bearing hydrolyzate.

Calcium phytate heretofore prepared by prior art processes does not give a product satisfying all of the above requirements. The utility of this invention lies in the fact that it discloses techniques for the production of a calcium phytate which is readily applicable to the food, pharmaceutical or chemical industry. It produces a product which is completely soluble in dilute hydrochloric acid solution, leaving no trace of insoluble substances which are undesirable in certain pharmaceutical preparations.

An important object of this invention is the preparation of improved and purified grades of insoluble salts of phytic acid, such as calcium phytate.

Another object is to present a complete process for the preparation of such purified compounds.

Other objects will in part be obvious and will in part appear hereinafter in connection with the description of this invention.

The most important and easily available source of phytic acid and its salts is corn steep liquor, a by-product of the corn wet-milling process. The phytic acid is present in the form of soluble acid salts which may be precipitated by the addition of an alkaline compound. The composition of the "phytin" which is precipitated will depend upon the nature of the alkaline compound used, but normally contains the metals calcium, magnesium, sodium and potassium. The precipitate is contaminated with carbohydrates and proteinaceous impurities. The prior art discloses the preparation of "phytin" from this and other raw material sources.

The improved process of the instant invention combines a number of improvements over the prior art processes. Thus, the steep liquor density is selected to give a product of optimum quality. Also, this process contemplates the filtration of the steep liquor prior to use in order to eliminate insoluble impurities. After the filtration, the steep liquor is treated with calcium hydroxide (where the calcium salt is being made) to raise the pH and cause the precipitation of a crude phytate, which is then washed to substantially eliminate soluble substances. The crude phytate is then dissolved in acid under optimum pH and temperature conditions and again precipitated by raising the pH to a selected value under carefully controlled conditions. This re-precipitated phytate is then separated, washed, dried and ground. The product is a fine, white powder of unusual purity and is far superior to the products of the prior art processes.

The various steps of the process of this invention will now be considered in detail, after which several examples will be presented to illustrate the manner in which the process may be carried out.

*Choice of density of steep liquor.*—The use of a proper gravity for steep liquor used in "phytin" preparation is of importance because of several factors, such as the economics of handling large volumes of liquid, yield and quality of "phytin" obtainable from such liquor. Taking all of these factors into consideration, it was found best to utilize steep liquor of 7–14 Baumé (at 60° F.). Anything below 7 Baumé required the handling of unduly large volumes of liquor, whereas anything above 14 Baumé gave "phytin" of a lower quality. The lighter Baumé liquors give faster and easier filtration of the "phytin" slurry and a better quality "phytin."

*Filtration of corn steep liquor.*—The filtration of corn steep liquor prior to the precipitation of "phytin" is desirable, since it removes all extraneous material which would contaminate the crude "phytin" and which would have a bearing upon the refinement stage of "phytin" when treated according to the method outlined. The filtration removes such impurities as degraded protein and other insolubles.

*Temperature at which "phytin" is precipitated from steep liquor.*—Precipitation of the crude "phytin" at an elevated temperature is of importance because it was found that the yields of phytate were greater at the higher temperatures. However, at higher temperatures the organic phosphorus content became lower. Therefore, in order to obtain a substantial yield of "phytin" and yet maintain a relatively high organic phosphorus content, it is better to use a temperature of about 110° to 140° F., and preferably about 125° F. The calcium content of the phytate tends to become lower as the temperature of precipitation is raised. This is not especially harmful, since the calcium content can be built up in the later refining stage, whereas the organic phosphorus content cannot.

*pH of "phytin" precipitation from steep liquor.*—In connection with the pH of precipitation of "phytin" from steep liquor, it was found that the range of about 4.5 to 12 could be used; however, it was preferable to use the range 5.0 to 5.8 for optimum results. At the higher pH values, both the yields and calcium content of the product were greater; however, the organic phosphorus content was lowered appreciably. To obtain a phytate of high "phytin" (organic) phosphorus content for producing a desirable refined product, it was found that precipitation of the crude "phytin" between the pH values 5.0 to 5.8 gave optimum results.

*Dissolving crude "phytin" in acid and re-precipitation.*—Dissolving the crude "phytin" in acid and re-precipitating by liming is very important, since it greatly purifies the "phytin." Thus, re-solution of the crude phytate in hydrochloric acid solution and heating the solution is important since it speeds up the precipitation of a substance containing both iron and "phytin" phosphorus, and which may be an impure iron phytate. If this material were not removed at this stage it would come down with the "phytin" when the latter is precipitated by elevating the pH. Also, if not removed by heating, slow precipitation of the impurities occurs when such acid phytate solutions are allowed to stand over an extended period of time at room temperature. If this precipitation is not complete before the phytate is isolated, then when the solution is alkalinized to precipitate the desired phytate, the iron complex is co-precipitate in sufficient amounts to contaminate the final product. The presence of this impurity is evidenced in the final product upon addition of acid. The calcium phytate dissolves whereas the impurity does not. It was found that heating speeds up and completes the precipitation of the contaminating substance. The precipitation was evidenced immediately by heating only slightly. However, the optimum condition for precipitation of the impurities is to heat from about 170° F. to boiling for ¼ to ¾ hours. The pH of the solution should be from about 0.5 to 3.0 pH, preferably 2.0 to 2.5 pH. The amount of impurities precipitated by this technique amounts to about 2.5 to 4.5% of the weight of the crude phytate.

This purification may be achieved in two ways, one of which involves savings in operational time and equipment. These processes are as follows: (1) after acidification of the crude phytate slurry to say, about 2.5 pH, the mixture is heated for ½ hour at about 180° F. and filtered. This separates extraneous material and insolubles in one step; (2) after acidification of the crude phytate slurry to about 2.5 pH, the extraneous material is filtered off and the filtrate subjected to heat treatment followed by filtration to remove heat precipitated material.

*Temperature at which neutralization is effected.*—The temperature at which the neutralization of the acid phytate solution with alkali is effected is of importance. It was found that in order to obtain a white final product the solution should be heated during the neutralization step. This process serves to decolorize the phytate. Temperatures of about 120° F. to boiling during neutralization were found to be effective in causing a bleaching action; however, the optimum conditions are to heat at about 170-200° F. during neutralization with alkali.

*pH of neutralization.*—The amount of lime necessary to produce a calcium phytate of desirable calcium and phosphorus content and to maintain good color characteristics was found to be that amount necessary to give a pH of about 6.3 to 6.8. The preferable pH value is about 6.5. This step should be carefully controlled, otherwise deviation from the above values gives a product that is not as desirable from a refined product standpoint. Limewater may be used for the final pH adjustment.

*Types of acid utilized in above procedures.*—The acid to be used is not limited to hydrochloric acid, but includes others which will not cause formation and subsequent precipitation of insoluble calcium salts. Acetic and nitric acids are examples of other acids which may be employed.

*Type of calcium compound used for precipitation of phytate.*—The herein described process is not limited to the use of calcium hydroxide for phytate precipitation. It also includes calcium oxide and carbonate as well as soluble salts of calcium, such as the chloride, acetate, or nitrate, etc. which may be used for producing high calcium ion concentrations.

Some illustrative examples of the process are presented below:

Example 1

Corn steep liquor having a Baumé of 12.0 at 60° F. and pH 4.35 was filtered and 800 mls. (165 g. d. s.) neutralized with a water slurry of lime to pH 5.25, the temperature of the reaction mixture at all times being maintained at about 80° F. The precipitated calcium phytate was filtered off and washed with three 125 mls. portions of warm water. The phytate was dried in an oven at 220° F. until the moisture content was about 10%. The yield of dry substance calcium phytate amounted to 12.3 g. or 7.45% of the dry substance of corn steep liquor used. The calcium and phytin phosphorus contents on a dry substance basis (D. S. B.) were 13.4% and 19.8% respectively.

Example 2

The experiment above was duplicated except that the pH was elevated to 5.75 with lime slurry. The weight of dry substance calcium phytate amounted to 18.9 g. or 11.45% of the dry substance of corn steep liquor used. The product analyzed 15.7% calcium and 18.7% "phytin" phosphorus.

Example 3

The experiment described in Example 1 was duplicated except the temperature at which the calcium phytate was precipitated was 120° F. The dry substance calcium phytate amounted to 16.2 g. or 9.82% of the dry substance of the corn steep liquor used. The product analyzed 13.7% calcium and 18.4% "phytin" phosphorus.

Example 4

In order to demonstrate yield changes and calcium and "phytin" phosphorus variations with varying pH of precipitation of calcium phytate while the temperature was held constant, the following runs were made:

Filtered corn steep liquor (3000 mls.) having Baumé 11.1 at 60° F. and pH 4.38 was maintained at 81° F. during the addition of lime to the pH values indicated in the table below. Individual runs were made in each case. The phytate was filtered off and washed with five 360 ml. portions of water then dried in an oven overnight at 220° F. The product in each case was analyzed. The table below shows the results obtained.

| pH | D. S. Weight "Phytin" | Percent of D. S. Steep Liquor | Percent Calcium D. S. B. | Percent "Phytin" Phosphorus D. S. B. |
|---|---|---|---|---|
| 5.05 | 27.8 | 4.9 | 13.0 | 19.6 |
| 5.25 | 43.7 | 7.7 | 13.3 | 18.9 |
| 5.45 | 53.8 | 9.5 | 14.7 | 19.0 |
| 6.15 | 61.5 | 10.9 | 16.1 | 17.3 |
| 7.05 | 86.4 | 15.2 | 18.2 | 14.0 |

Example 5

A known amount of crude calcium phytate was slurried in dilute hydrochloric acid at room temperature to pH 2.26 and filtered to remove extraneous material. The filtrate was diluted so that 100 ml. contained 9 g. of "phytin." Aliquots of 100 mls. each were heated for the same length of time (5 minutes) at varying temperatures and the insolubles formed, filtered, dried and weighed. The table below indicates the results obtained:

Temperature, ° F.: Weight insolubles (g.)
122 _____ 0.21
140 _____ 0.25
158 _____ 0.29
176 _____ 0.39
194 _____ 0.37

Example 6

A known amount of crude "phytin" was slurried in dilute hydrochloric acid at room temperature to pH 2.30 and filtered to remove extraneous material. The filtrate was diluted with water such that 100 ml. contained 9.5 gms. "phytin." 100 ml. aliquots were heated at 176° F. for varying lengths of time and filtered to remove insolubilized material which was subsequently dried and weighed. The table below lists the results obtained:

Heating time (hrs.): Weight insolubilized material (g.)
0 _____ 0.00
¼ _____ 0.16
½ _____ 0.24
¾ _____ 0.21
1 _____ 0.19

Each of the filtrates from the above experiments were heated to 176° F. and lime slurry added with good agitation to each aliquot to a pH of 6.5. The precipitated "phytin" was filtered off, washed with 150 mls. water and dried over-night in an air oven at 185° F. Treatment of a weighed amount (½ g.) of each sample with 50 ml. 0.07 N. hydrochloric acid gave clear solutions with the exception of the sample which had not been subjected to the acid heat treatment. A cloudy solution was obtained in the latter case.

While the foregoing description of the process has been largely directed to the preparation of calcium phytate, it will be obvious to those skilled in the art that the various inventive features of the process can readily be adapted to the preparation of other insoluble salts, such as the magnesium, strontium, and barium salts. In fact, the process may be adapted with minor variations to the preparation of any insoluble phytate which can be redissolved in acid and reprecipitated therefrom by treating with the appropriate metal compound.

Other minor deviations will be apparent to those skilled in the art, but it is intended that such non-inventive variations be covered by the following claim.

That which is claimed as new is:

The process of preparing calcium phytate, which comprises treating corn steepwater liquor having a density in the range of about 7 to 14° Baumé measured at 60° F.

with a calcium ion-furnishing compound to precipitate crude calcium phytate, the precipitation being carried out at a pH in the range of about 5.0 to 5.8 and at a temperature in the range of about 110° to 140° F., separating the precipitated crude phytate, redissolving the crude phytate in an acid solution at a pH in the range of about 0.5 to 3 and at a temperature of about 170° F. to boiling for about ¼ to ¾ of an hour, separating insolubles from said solution, reprecipitating calcium phytate from said solution at a pH in the range of about 6.3 to 6.8 at a temperature of about 120° F. to boiling by the addition of a calcium ion-furnishing compound, and recovering the precipitated calcium phytate.

References Cited in the file of this patent

UNITED STATES PATENTS

| | | |
|---|---|---|
| 2,268,556 | Adams | Jan. 6, 1942 |
| 2,313,276 | Schopmeyer | Mar. 9, 1943 |
| 2,465,733 | Levis | Mar. 29, 1949 |